(12) United States Patent
Min

(10) Patent No.: US 7,464,624 B2
(45) Date of Patent: Dec. 16, 2008

(54) MOTOR DRIVEN STEERING COLUMN SYSTEM OF VEHICLE CAPABLE OF INTERCHANGING TILT/TELESCOPIC MODES USING GEARS

(75) Inventor: Jun Yong Min, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 559 days.

(21) Appl. No.: 11/304,001

(22) Filed: Dec. 13, 2005

(65) Prior Publication Data

US 2006/0175821 A1    Aug. 10, 2006

(30) Foreign Application Priority Data

Jan. 3, 2005    (KR) .................. 10-2005-0000145

(51) Int. Cl.
*B62D 1/18*    (2006.01)

(52) U.S. Cl. .................. 74/493; 74/495; 280/775
(58) Field of Classification Search ............ 74/493, 74/495, 496, 498, 500, 425, 89.14; 280/775; 192/48.2, 48.9, 84.6, 20, 82 P
See application file for complete search history.

(56) References Cited

U.S. PATENT DOCUMENTS

2004/0239089 A1    12/2004   Armstrong et al.

FOREIGN PATENT DOCUMENTS

| JP | 01-190578 | 7/1989 |
|---|---|---|
| JP | 02-133280 | 5/1990 |
| JP | 07-081585 | 3/1995 |
| JP | 2001-199350 | 7/2001 |

*Primary Examiner*—Thu Nguyen
*Assistant Examiner*—Timothy J Murphy
(74) *Attorney, Agent, or Firm*—Morgan, Lewis & Bockius LLP

(57) ABSTRACT

A motor driven steering column system of a vehicle capable of interchanging tilt/telescopic modes using a single motor generating driving force by switching power transfer routes of the single motor using a small-sized motor in tilt/telescopic operations. The motor driven steering column system includes a driving motor generating rotational force for tilt/telescopic operations by receiving battery power according to a control signal of a mode control switch, an ECU selectively transferring the rotational force of the driving motor by determining the tilt/telescopic modes according to the control signal of the mode control switch, and a power switching unit controlled by the ECU for operating the motor driven steering column system in a selected mode.

7 Claims, 3 Drawing Sheets

MOTOR DRIVEN STEERING COLUMN SYSTEM OF VEHICLE CAPABLE OF INTERCHANGING TILT/TELESCOPIC MODES USING GEARS

CROSS-REFERENCE TO RELATED APPLICATION

This application claims priority to and the benefit of Korean Patent Application 10-2005-0000145 filed in the Korean Intellectual Property Office on Jan. 3, 2005, the entire content of which is incorporated herein by reference.

BACKGROUND OF THE INVENTION

1. Field of the Invention

The present invention relates to a motor driven steering column system of a vehicle capable of interchanging tilt/telescopic modes. More particularly, the present invention relates to a motor driven steering column system of a vehicle capable of interchanging tilt/telescopic modes by forming power transfer routes for tilt/telescopic operations using a single motor.

2. Description of the Prior Art

In general, a steering column system of a vehicle is used for changing the traveling direction of the vehicle. To this end, the steering column system shifts the alignment direction of front wheels or all wheels by a predetermined angle, thereby controlling the traveling direction of the vehicle. Typically, the steering force of a driver is transferred to a knuckle arm of a vehicle wheel through a steering gear, links, etc so that the knuckle arm of the vehicle is rotated, thereby changing the traveling direction of the vehicle.

A steering shaft of the steering column system is coupled with a hub provided at the center of the steering handle. The length of the steering wheel is fixed so that it is impossible to adjust the length of the steering wheel according to the driver's body condition. In order to solve the above problem, a tilt/telescopic unit capable of adjusting the length and the angle of the steering shaft according to the driver's body condition has been suggested and extensively used.

Recently, tilt/telescopic operations are controlled using driving force of a motor so as to allow the driver to easily manipulate the tilt/telescopic steering column system. That is, a motor driven steering column system interchanges the telescopic linear movement and the tilt rotating movement by using rotational force of the motor so that the height and the angle of the steering shaft can be easily adjusted according to the driver's taste and body condition. In addition, it is possible to memorize the desired position of the steering shaft in order to return the steering shaft to the desired position as required by the driver.

However, since the motor driven steering column system uses motors for tilt and telescopic operations, respectively, the number of components and manufacturing cost for the steering column system may increase.

SUMMARY OF THE INVENTION

Embodiments of the present invention provide a motor driven steering column system of a vehicle capable of interchanging tilt/telescopic modes using a single motor generating driving force by switching power transfer routes of the single motor using a small-sized motor in tilt/telescopic operations.

In an exemplary embodiment of the present invention a motor driven steering column system comprises: a single driving motor for rotating a driving shaft formed at an outer peripheral portion thereof with a driving shaft gear to generate rotational force for tilt/telescopic operations by receiving battery power from an ECU to which a control signal of a mode control switch is transmitted; a power switching unit including a reversible motor driven in a forward or reverse direction according to a control signal of the ECU, a transfer gear engaged with a gear formed in a driving shaft of the reversible motor such that the transfer gear rotates in the forward or reverse direction, a movable rack lever linearly moved while being engaged with a transfer shaft gear provided at one side of the transfer gear, and a switch lever fixed to one end of the movable rack lever by means of a coupling pin in order to perform a seesaw movement according to the linear movement of the movable rack lever so as to selectively switch rotational force of the driving motor for the tilt/telescopic operations; and tilt/telescopic power transfer units including rotation support shafts formed at outer peripheral portions thereof with power transfer gears engaged with both sides of the driving shaft gear formed in the driving shaft of the driving motor, movable shafts receiving the rotation support shafts in which outer peripheral portions of the movable shafts are positioned within a predetermined interval formed between a connection rod and an actuating rod section of the switch lever such that the movable shafts receive rotational force while linearly moving according to an actuating direction of the switch lever, and connection gear sections formed in the rotation support shafts and the movable shafts such that the connection gear sections are attached to or detached from each other by means of the switch lever, respectively.

BRIEF DESCRIPTION OF THE DRAWINGS

The features and advantages of the claimed invention will be more apparent from the following detailed description taken in conjunction with the accompanying drawings.

DETAILED DESCRIPTION OF THE PREFERRED EMBODIMENTS

Figure 1:
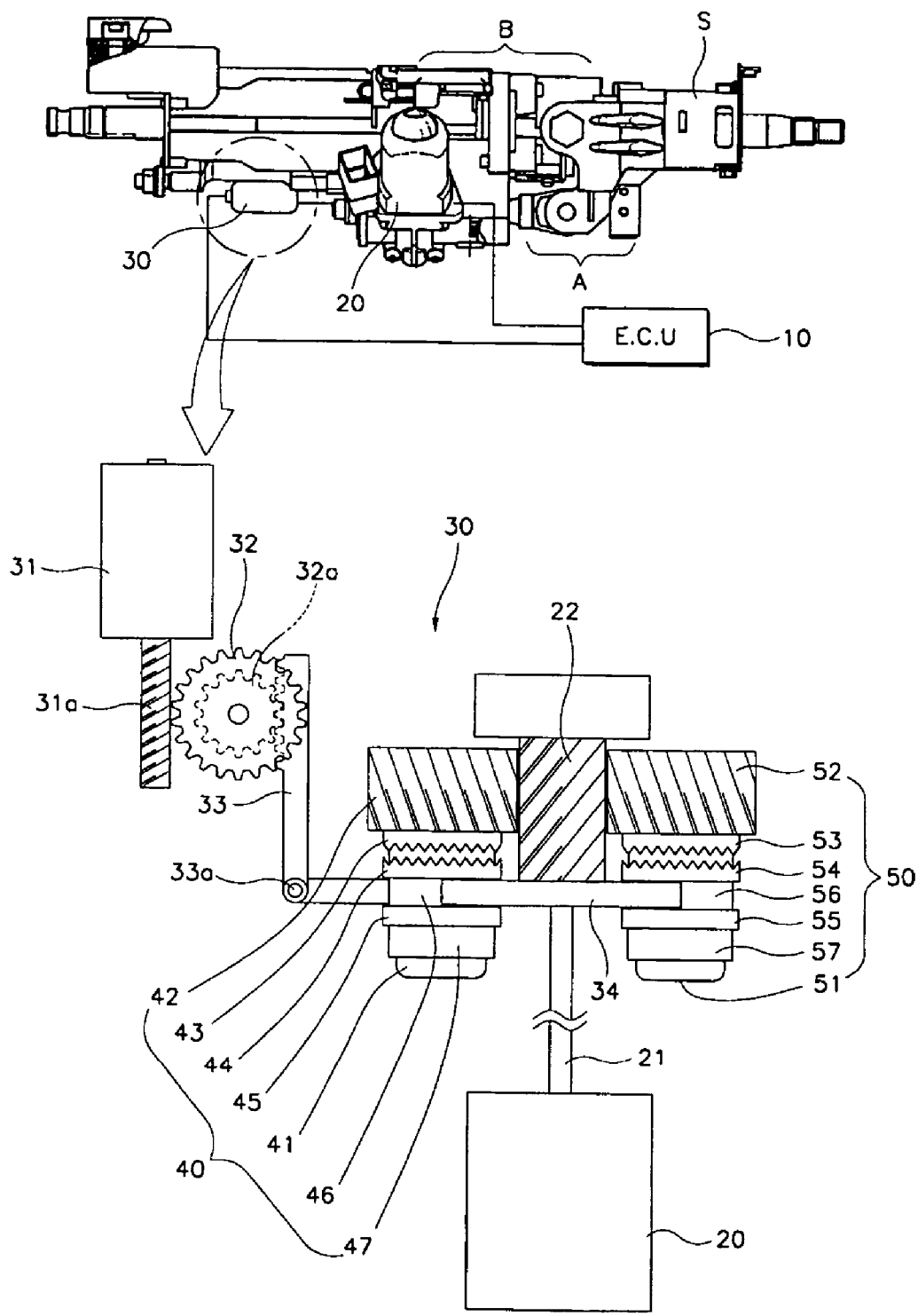
FIG. 1 is a schematic view illustrating the structure of a motor driven steering column system capable of interchanging tilt/telescopic modes using gears according to one embodiment of the present invention.

Hereinafter, preferred embodiments of the present invention will be described with reference to the accompanying drawings. In the following description and drawings, the same reference numerals are used to designate the same or similar components, so repetition of the description on the same or similar components will be omitted.

As shown in FIG. 1, a motor driven steering column system according to an exemplary embodiment of the present invention includes a driving motor 20 generating rotational force for tilt/telescopic modes, an ECU 10 selectively transferring the rotational force of the driving motor 20 by determining the tilt/telescopic modes according to a control signal from a mode control switch, and a power switching unit 30 controlled by the ECU 10 for operating the motor driven steering column system in a selected mode. The ECU (electronic control unit) may comprise a processor, memory and associated hardware, software and/or firmware as may be selected and programmed by a person of ordinary skill in the art based on the teachings herein. The mode control switch (not shown) is operated by a user to select a desired mode and then sends an appropriate signal to the ECU 10.

Figure 2:
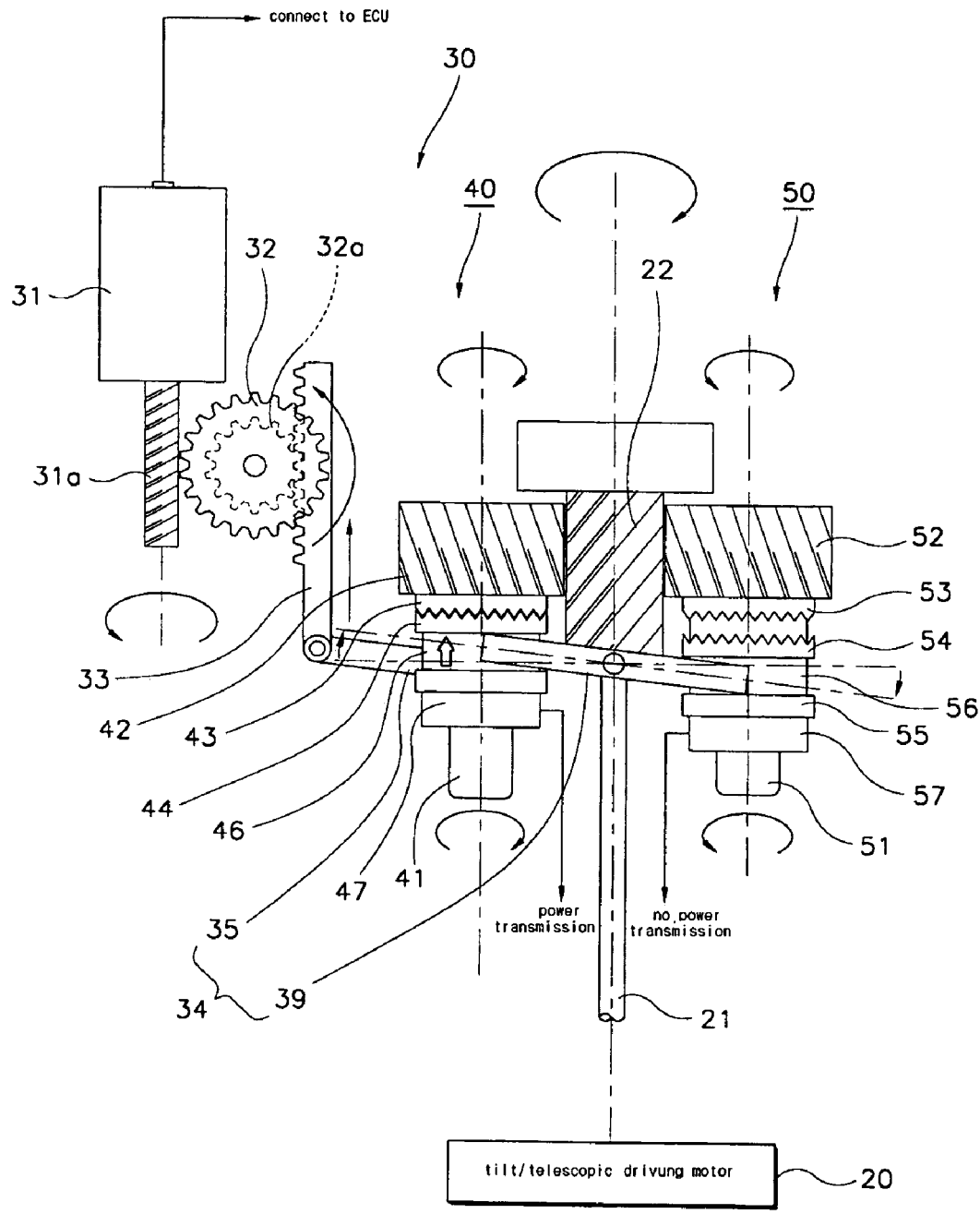
FIG. 2 is a schematic view illustrating the structure of a switch lever for switching a driving force transfer route of a driving motor for tilt/telescopic modes according to one embodiment of the present invention.

As shown in FIG. 2, the power switching unit 30 includes a reversible motor 31 driven in the forward or reverse direction (clockwise or counterclockwise direction) according to the control signal of the ECU 10, a transfer gear 32 engaged with a gear formed in a driving shaft 31a of the reversible motor 31 such that the transfer gear 32 rotates in the forward or reverse direction, a movable rack lever 33 linearly moved while being engaged with a transfer shaft gear 32a provided at one side of the transfer gear 32, a switch lever 34 fixed to one end of the movable rack lever 33 by means of a coupling pin 33a in order to perform a seesaw movement according to the linear movement of the movable rack lever 33, and tilt/telescopic power transfer units 40 and 50 for transferring power for tilt/telescopic operations according to the direction of the seesaw movement of the switch lever 34, respectively. The reversible motor 31, the transfer gear 32 and the switch lever 34 are accommodated in a housing (not shown).

Figure 3:
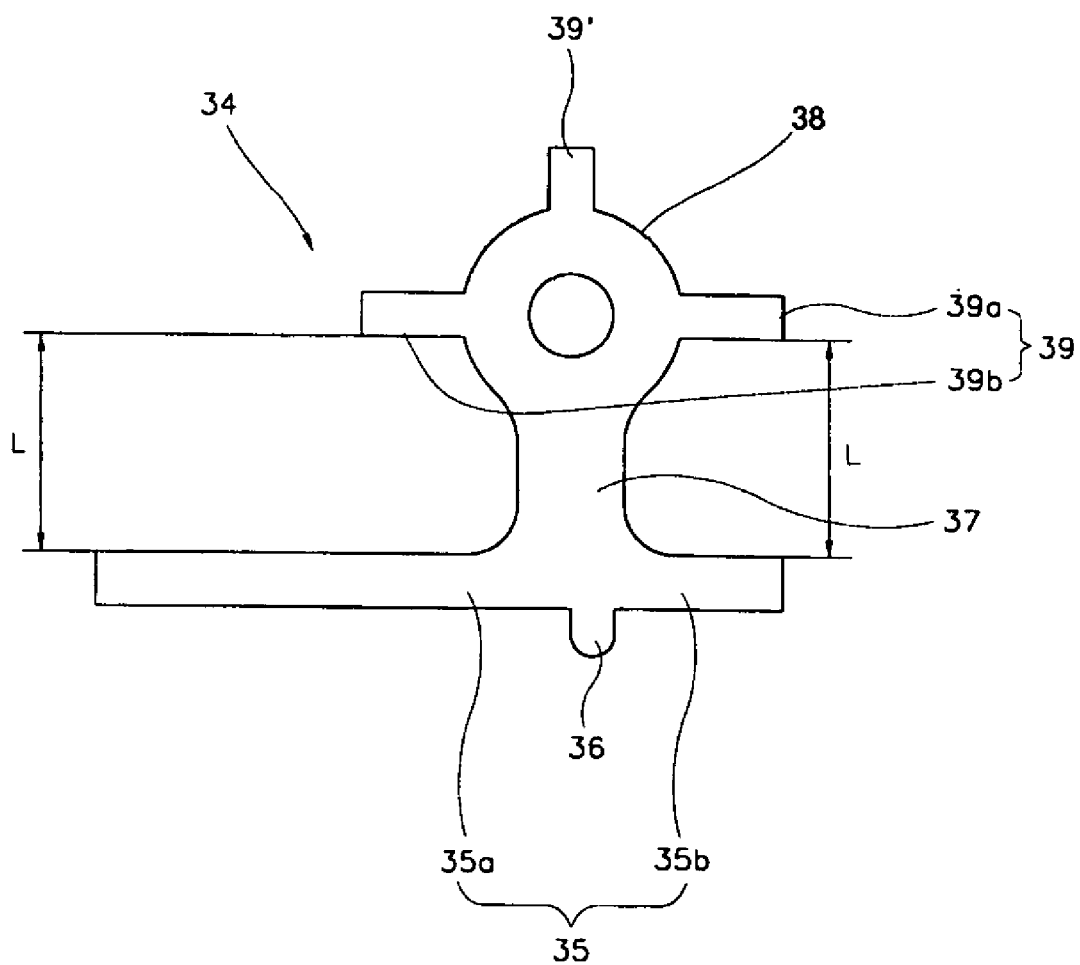
FIG. 3 is a side view of a switch lever for selectively transferring driving force of a motor according to one embodiment of the present invention.

In addition, as shown in FIG. 3, the switch lever 34 includes a connection rod 35 formed at a lower surface thereof with a lower hinge support shaft 36 such that the lower hinge support shaft 36 serves as a hinge shaft with respect to the housing and one end of which is coupled with the movable rack lever 33 through the coupling pin 33a, a support body 38 provided at an upper portion of a connection body 37 vertically protruding upward from the connection rod 35 and formed with a perforation hole for receiving a driving shaft 21 of the driving motor 20, an actuating rod section 39 horizontally extending from both sides of the support body 38 by a predetermined distance, and an upper hinge support shaft 39' vertically protruding upward from the upper portion of the support body 38 so as to serve as a hinge shaft with respect to the housing.

A predetermined interval (L) is formed between the connection rod 35 having first and second actuating wings 35a and 35b and the actuating rod section 39 having first and second actuating wings 39a and 39b. The first actuating wing 35a of the connection rod 35 is coupled with the movable rack lever 33 through the coupling pin 33a.

In addition, tilt/telescopic power transfer units 40 and 50 are aligned about the driving motor 20 such that driving force of the driving motor 20 can be selectively transferred to the tilt/telescopic power transfer units 40 and 50 according to the operation of the switch lever 34. That is, the tilt/telescopic power transfer units 40 and 50 engage with both sides of a driving shaft gear 22 formed in the driving shaft 21 of the driving motor 20 and are actuated by means of the switch lever 34 in order to perform the tilt/telescopic operations by selectively receiving the driving force of the driving motor 20.

As shown in FIG. 1, tilt/telescopic power transfer units 40 and 50 include rotation support shafts 41 and 51 formed at outer peripheral portions thereof with power transfer gears 42 and 52 engaged with both sides of the driving shaft gear 22 formed in the driving shaft 21 of the driving motor 20, movable shafts 47 and 57 receiving the rotation support shafts 41 and 51 in which outer peripheral portions of the movable shafts 47 and 57 are positioned within the predetermined interval (L) formed between the connection rod 35 and the actuating rod section 39 of the switch lever such that the movable shafts 47 and 57 receive rotational force while linearly moving according to the actuating direction of the switch lever 34, and connection gear sections formed in the rotation support shafts 41 and 51 and the movable shafts 47 and 57 such that they are attached to or detached from each other by means of the switch lever 34, respectively.

The connection gear sections include connection gears 43 and 53 provided at one side of each power transfer gear 42 and 52 of the rotation support shafts 41 and 51 and movable gears 44 and 54 provided at end portions of the movable shafts 47 and 57 with diameters larger than those of the movable shafts 47 and 57 in opposition to the connection gears 43 and 53, respectively. The connection gears 43 and 53 and the movable gears 44 and 54 are formed at surfaces thereof facing each other with saw-teeth or gear-teeth, respectively.

In addition, locking flanges 45 and 55 having diameters larger than those of the movable shafts 47 and 57 are provided at outer peripheral portions of the movable shafts 47 and 57 in such a manner that the locking flanges 45 and 55 can form receiving cavities 46 and 56 in cooperation with the movable gears 44 and 54. When the first and second actuating wings 35a and 35b of the connection rod 35 and the first and second actuating wings 39a and 39b of the actuating rod section 39 of the switch lever 34 are moved, the locking flanges 45 and 55 make contact with the first and second actuating wings of the connection rod 35 and the actuating section 39, thereby engaging the movable gears 44 and 54 with the power transfer gears 42 and 53 or disengaging the movable gears 44 and 54 from the power transfer gears 42 and 53.

Hereinafter, the operation of the present invention will be described in detail with reference to accompanying drawings.

If a user selects the tilt mode or the telescopic mode by using the mode control switch in order to operate the motor driven tilt/telescopic steering column system, the mode control switch sends a selected control signal to the ECU 10. Upon receiving the selected control signal from the mode control switch, the ECU 10 operates the driving motor 20 and the power switching unit 30, simultaneously. Therefore, the tilt operation or the telescopic operation is performed according to the driving power generated from the driving motor 20.

For instance, in a case of the tilt operation, the user turns on a tilt mode switch of the mode control switch in order to tilt the steering column. The tilt control signal generated from the tilt mode switch is transferred to the ECU 10, so that the ECU supplies battery power to the driving motor 20 and the power switching unit 30.

The rotational direction of the driving motor 20 for the tilt operation is assumed as a clockwise direction.

As the driving motor 20 is driven, the driving shaft gear 22 is rotated by receiving the driving force of the driving motor 20 through the driving shaft 21. At this time, if the operation of the power switching unit 30 has not been completed as shown in FIG. 1, the driving force of the driving motor 20 is not transferred to the tilt/telescopic power transfer units 40 and 50. This is because the rotation support shafts 41 and 51 of the tilt/telescopic power transfer units 40 and 50 disengage from the connection gears formed in the movable shafts 47 and 57, respectively.

As the ECU 10 supplies the battery power to the power switching unit 30, the reversible motor 31 rotates in the counterclockwise direction (reverse direction) so that the transfer gear 32 engaged with the gear formed in the driving shaft 31a of the reversible motor 31 is also rotated in the counterclockwise direction, thereby moving up the movable rack lever 33 (see, FIG. 2). That is, the movable rack lever 33 engaged with the transfer shaft gear 32a provided at one side of the transfer gear 32 is moved upward as the transfer shaft gear 32a rotates in the counterclockwise direction, thereby actuating the switch lever 34 coupled to the movable rack lever 33 through the coupling pin 33a.

Thus, the switch lever 34 is pulled down by means of the movable rack lever 33 so that the switch lever 34 performs the seesaw movement about the lower and upper hinge support shafts 36 and 39' coupled to the housing. That is, as the first actuating wing 35a of the connection rod 35 of the switch lever 34 is pulled down by means of the movable rack lever 33, the switch lever 34 positioned between the tilt/telescopic power transfer units 40 and 50 performs the seesaw movement about the lower and upper hinge support shafts 36 and 39'. As the switch lever 34 performs the seesaw movement, the first and second actuating wings 39a and 39b of the actuating rod section 39 actuate the movable shafts 47 and 57 of the tilt/telescopic power transfer units 40 and 50. That is, as the switch lever 34 performs the seesaw movement in the clockwise direction while being pulled down by means of the movable rack lever 33, the first actuating wing 39a of the actuating rod section 39 moves the movable shaft 47 upward so that the movable gear 44 formed in the movable shaft 47 may engage with the connection gear 43 formed in the rotation support shaft 41.

As the movable gear 44 engages with the connection gear 43, rotational force of the rotation support shaft 41 rotating in the counterclockwise direction while being engaged with the driving shaft gear 22 of the driving motor 20 through the power transfer gear 42 is transferred to the movable gear 44. Thus, the movable gear 44 engaged with the connection gear 43 formed in the rotation support shaft 41 may rotate the movable shaft 47 and rotational force of the movable shaft 47 is transferred to a tilt actuating unit (not shown) generally known in the art, so that the tilt operation is carried out In the meantime, while the tilt power transfer unit 40 is being operated, the telescopic power transfer unit 50 may not operate because the rotational force of the driving motor 20 is not transferred to the telescopic power transfer unit 50. That is, as shown in FIG. 2, when the switch lever 34 performs the seesaw movement in the clockwise direction, the second actuating wing 39b of the actuating rod section 39 moves the movable shaft 57 of the telescopic power transfer unit 50 downward so that the rotational force of the driving motor 20 is not transferred to the telescopic power transfer unit 50.

In other words, as the movable gear 54 formed in the movable shaft 57 moves away from the connection gear 53 provided in the rotation support shaft 51, the movable gear 54 disengages from the connection gear 53. Thus, the rotation support shaft 51 rotating in the clockwise direction while being engaged with the driving shaft gear 22 of the driving motor 20 through the power transfer gear 52 is idly rotated while being coupled with the movable shaft 47, so that the rotational force of the movable shaft 57 is not transferred to a telescopic actuating unit (not shown) generally known in the art, so that the telescopic operation is not performed.

In the meantime, if the user turns on a telescopic mode switch of the mode control switch in order to operate the steering column in the telescopic mode, the control signal generated from the telescopic mode switch is transferred to the ECU 10, so that the ECU supplies battery power to the driving motor 20 and the power switching unit 30. At this time, different from the tilt operation of the power switching unit 30, the rotational force of the driving motor 20 is transferred to the telescopic power transfer unit 50. The procedure of the telescopic operation is substantially identical to the procedure of the tilt operation except that the switch lever 34 performs the seesaw movement in the counterclockwise direction, so the detailed description thereof will be omitted below in order to avoid redundancy.

As described above, according to an exemplary embodiment of the present invention, the rotational force of the single driving motor is selectively switched in order to operate the steering column system in the tilt mode or the telescopic mode, so that the present invention can reduce the number of motors and components and simplify the structure of the motor driven steering column system.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A motor driven steering column system capable of interchanging tilt/telescopic modes using gears, the motor driven steering column system comprising:

a driving motor for rotating a driving shaft formed at an outer peripheral portion thereof with a driving shaft gear to generate rotational force for tilt/telescopic operations;

a power switching unit including a reversible motor driven in a forward or reverse direction, a transfer gear engaged with a gear formed in a driving shaft of the reversible motor such that the transfer gear rotates in the forward or reverse direction, a movable rack lever linearly moved while being engaged with a transfer shaft gear provided at one side of the transfer gear, and a switch lever fixed to one end of the movable rack lever by a coupling pin in order to perform a seesaw movement according to the linear movement of the movable rack lever so as to selectively switch rotational force of the driving motor for the tilt/telescopic operations; and tilt/telescopic power transfer units including rotation support shafts formed at outer peripheral portions thereof with power transfer gears engaged with both sides of the driving shaft gear formed in the driving shaft of the driving motor, movable shafts receiving the rotation support shafts in which outer peripheral portions of the movable shafts are positioned within a predetermined interval formed between a connection rod and an actuating rod section of the switch lever such that the movable shafts receive rotational force while linearly moving according to an actuating direction of the switch lever, and connection gear sections formed in the rotation support shafts and the movable shafts such that the connection gear sections are attached to or detached from each other by means of the switch lever, respectively.

2. The motor driven steering column system as claimed in claim 1, wherein the switch lever comprises:

a connection rod formed at a lower surface thereof with a lower hinge support shaft such that the lower hinge support shaft serves as a hinge shaft with respect to a housing and one end is coupled with the movable rack lever through the coupling pin;

a support body provided at an upper portion of a connection body vertically protruding upward from the connection rod and formed with a perforation hole for receiving the driving shaft of the driving motor, an actuating rod section horizontally extending from both sides of the support body by a predetermined distance; and an upper hinge support shaft vertically protruding upward from an upper portion of the support body so as to serve as a hinge shaft with respect to the housing.

3. The motor driven steering column system as claimed in claim 2, wherein the connection rod includes first and second actuating wings and the actuating rod section includes first and second actuating wings, the first and second actuating wings of the connection rod and the actuating rod section horizontally extending in left and right directions on a basis of the connection body while forming the predetermined interval therebetween.

4. The motor driven steering column system as claimed in claim 1, wherein the connection gear sections include connection gears provided at one side of each power transfer gear of the rotation support shafts and movable gears provided at end portions of the movable shafts with diameters larger than those of the movable shafts in opposition to the connection gears, respectively, the connection gears and the movable gears being formed at surfaces thereof facing each other with saw-teeth or gear-teeth, respectively.

5. The motor driven steering column system as claimed in claim 1, wherein locking flanges having diameters larger than those of the movable shafts are provided at outer peripheral portions of the movable shafts in such a manner that the locking flanges form receiving cavities in cooperation with the movable gears, the connection rod and a part of the actuating rod section of the switch lever being accommodated in the receiving cavities.

6. The motor driven steering column system as claimed in claim 1, further comprising an electronic control unit, said electronic control unit configured to receive user inputs and generate control signal outputs in response thereto, wherein said driving motor and power switching unit operate in response to control signals from the electronic control unit.

7. The motor driving steering column system as claimed in claim 1, wherein said system has a single driving motor.

* * * * *